United States Patent [19]
Arai et al.

[11] 3,725,858
[45] Apr. 3, 1973

[54] VEHICLE SKID CONTROL DEVICE

[75] Inventors: Hiroshi Arai; Jun Ohta, both of Toyota-shi, Aichi-ken, Japan

[73] Assignee: Toyota Jidasha Kogyo, Kabushiki Kaisha, Toyota-shi, Aichi-ken, Japan

[22] Filed: Sept. 1, 1971

[21] Appl. No.: 176,810

[30] Foreign Application Priority Data

Dec. 30, 1970 Japan..........................45/134519

[52] U.S. Cl..............340/53, 303/21 BE, 188/181 R
[51] Int. Cl.................................................B60t 8/08
[58] Field of Search...........340/52 R, 52 B, 52 C, 53; 303/21 R, 21 EB, 21 BE; 188/181 R, 181 C

[56] References Cited

UNITED STATES PATENTS

| | | | |
|---|---|---|---|
| 3,606,493 | 9/1971 | Schlitz et al.................. | 188/181 R X |
| 3,640,589 | 2/1972 | Taniguchi..................... | 188/181 R X |

Primary Examiner—Alvin H. Waring
Attorney—Stevens, Davis, Miller & Mosher

[57] ABSTRACT

A skid control device for vehicles, comprising a wheel velocity voltage generator adapted to generate a voltage corresponding to wheel velocity, a control circuit adapted to produce a braking pressure reducing signal by determining the occurrence of wheel lock from the wheel velocity voltage, an electromagnetic three-way change-over valve responsive to the braking pressure reducing signal to modulate the braking pressure, a braking pressure modulator which changes the braking pressure of the wheel cylinder by means of the operating signal from said change-over valve, a braking switch adapted to produce an electric signal in conformity with the effort applied to the brake pedal, and an AND circuit adapted to produce a skid control signal in accordance with the "and" of the signal derived from the controller and the signal derived from the braking switch, thus preventing the wheel from becoming locked during braking.

2 Claims, 2 Drawing Figures

INVENTORS
HIROSHI ARAI,
JUN OHTA

BY *Stevens, Davis, Miller & Mosher*
ATTORNEYS

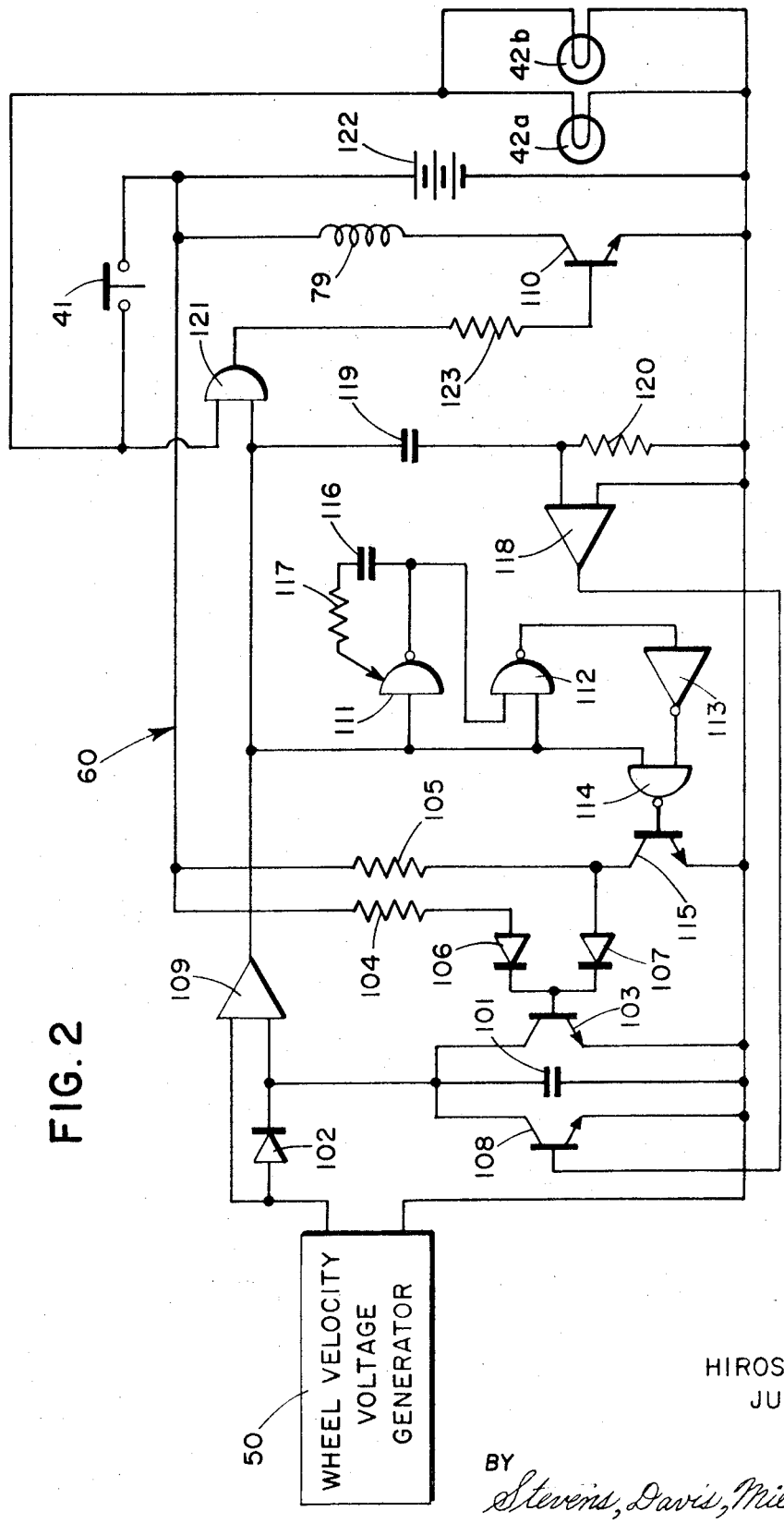

VEHICLE SKID CONTROL DEVICE

BACKGROUND OF THE INVENTION

This invention relates to a device for preventing vehicle wheel lock from occurring when emergency braking is applied when the vehicle is in normal motion and more particularly to a skid control device for use on automobiles.

Most conventional skid control devices consist of a wheel lock detecting means and a braking pressure modulating means. They are designed so that wheel lock is determined to have occurred when changes in the deceleration of wheel velocity become larger than the set deceleration of the reference wheel velocity which has been predetermined by the lock detecting means. The braking pressure modulating means then shuts off the brake line to reduce the braking pressure, thus preventing vehicle skidding.

The changes in the deceleration of wheel velocity to be used for determining wheel lock become suddenly large, not only in the case of the above-mentioned emergency braking, but also when a wheel is to be stopped or caused to run at a low velocity by releasing the acceleration pedal after idle rotation of the wheel resulting from rapid starting or rapid acceleration on a slippery frozen road, gravel road or a road covered with snow. Therefore, the lock detecting means may be actuated due to changes in the deceleration of wheel velocity in cases other than emergency braking, thus reducing the braking pressure and making the brake operation impossible for a certain period of time. Consequently, the vehicle driver may experience temporarily a feeling of psychological unrest, and there may be a danger of collision with another vehicle in his path.

SUMMARY OF THE INVENTION

The object of this invention is to eliminate the disadvantages described above and to ensure vehicle skid control only when emergency braking is applied during normal travelling.

In the skid control device according to this invention, the signal produced by the comparator of the lock detecting means upon determination of wheel lock in accordance with the changes in the deceleration of wheel velocity is supplied to an AND circuit. Moreover, the brake switch is interlocked with the brake pedal so that a braking signal is supplied to said AND circuit only when the brake pedal is operated. The output of said AND circuit is applied to the braking pressure modulating means, and the skid control operation is initiated by means of the braking pressure modulating means only when the signals from the comparator and the braking switch are simultaneously applied. Thus, normal brake operation is performed at times when the wheel is rotating idly with no effort applied to the brake pedal.

BRIEF DESCRIPTION OF THE DRAWINGS

In the accompanying drawings:

FIG. 2 is a control circuit diagram of the device in FIG. 1.

DESCRIPTION OF A PREFERRED EMBODIMENT

Figure 1:
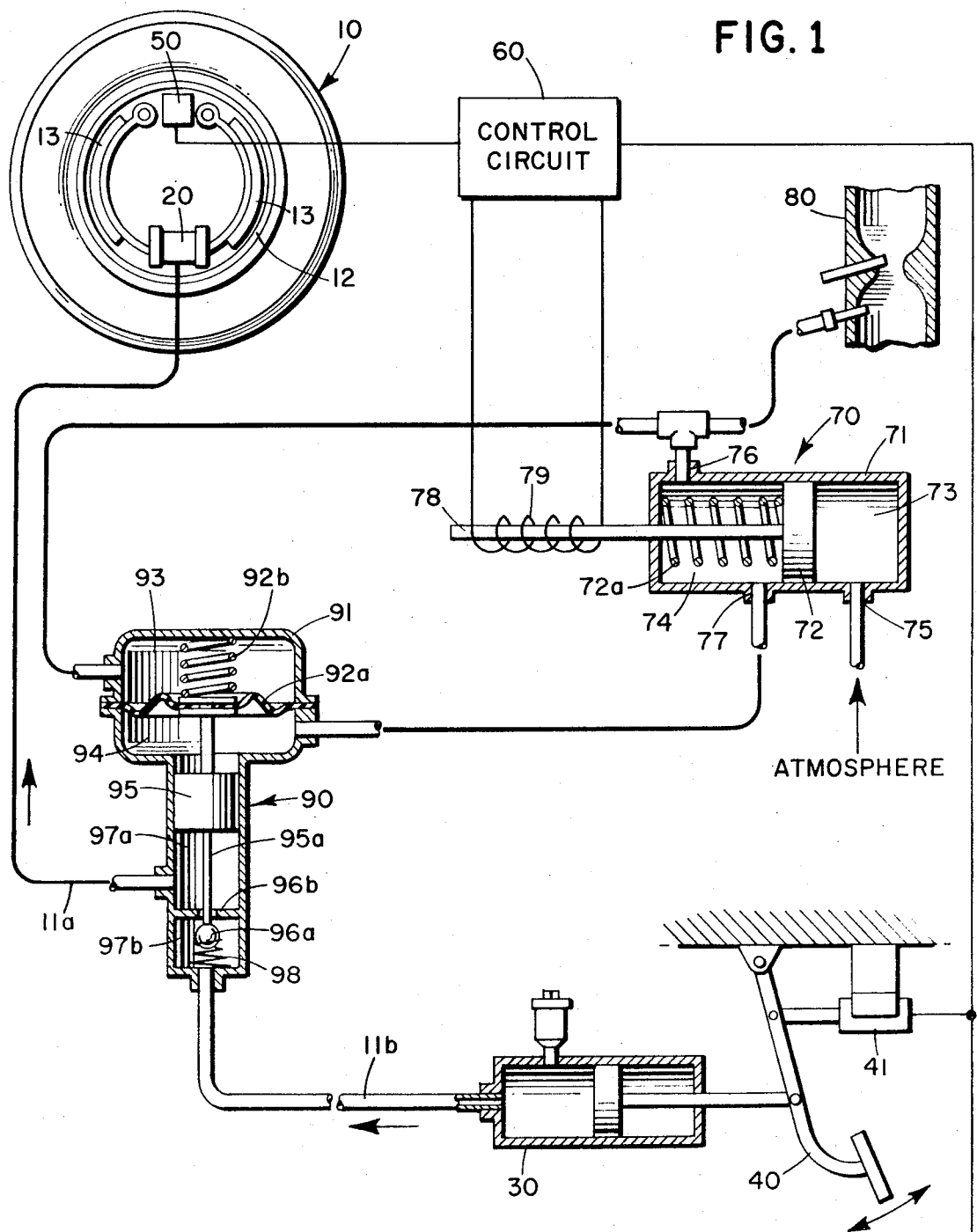
FIG. 1 shows schematically a skid control device embodying this invention.

Referring now to FIG. 1, a brake line is constituted by providing hydraulic pressure lines 11a and 11b between a master cylinder 30 connected to a brake pedal 40 and a wheel cylinder 20 of a wheel 10 having a brake drum 12 and a brake shoe 13. In the above-described brake line, the skid control device comprises a wheel velocity voltage generator 50 installed on the wheel 10 and adapted to generate a DC voltage corresponding to the wheel velocity, a braking switch 41 which is turned on or off in accordance with the effort applied to the brake pedal 40, a control circuit 60 adapted to determine the occurrence of wheel lock upon receiving the wheel velocity voltage and to issue a braking pressure reducing signal upon receiving the signal from the braking switch 41 only when wheel lock occurs during braking, an electromagnetic three-way change-over valve 70 adapted to modulate the braking pressure upon receiving the braking pressure reducing signal, and a braking pressure modulator 90 which performs anti-skid operation by reducing the braking pressure in accordance with the operating signal derived from said change-over valve 70 only when wheel lock is caused during braking.

The electromagnetic three-way change-over valve 70 comprises an electromagnetic coil 79 and a cylinder 71. An operating rod 78 having a spring 72a at the back thereof and a piston 72 are slidably inserted into the cylinder 71, thus dividing the cylinder 71 into two chambers 73 and 74. The chamber 73 has a hole 75 which opens to the atmosphere, and another chamber 74 has two connecting holes 76 and 77. The connecting hole 76 is connected to an intake pipe 80 of the vehicle engine to introduce negative pressure from the engine intake. The other connecting hole 77 is connected to the braking pressure modulator 90. When no pressure reducing signal is applied, the electromagnetic coil 79 is de-energized and the piston 72 establishes communication between the connecting holes 76 and 77 by the action of the spring 72a, thereby establishing a negative pressure in the braking pressure modulator 90. On the other hand, when the pressure reducing signal exists, the electromagnetic coil 79 is excited, and the connecting hole 77 is brought into communication with the hole 75, thus introducing atmospheric pressure.

The braking pressure modulator 90 comprises a case 91 which is divided into two chambers 93 and 94 by means of a diaphragm 92a. The chamber 93, having a spring 92b connected to the diaphragm 92a, is connected to the intake pipe 80. Another chamber 94 is connected to the connecting hole 77 of the electromagnetic three-way change-over valve 70. Furthermore, the chamber 94 is divided into two chambers 97a and 97b by means of a valve seat 96b. A piston 95 connected to the diaphragm 92a and having a valve operating means 95a is inserted into the chamber 97a. Moreover, said chamber 97a is connected to the line 11a at the wheel cylinder side. The other chamber 97b, in which a valve body 96a is pressed against the valve seat 96b by means of a spring 98, is connected to the line 11b at the master cylinder side. Thus, when no pressure reducing signal exists, the pressures in both chambers 93 and 94 become equally negative due to the action of the electromagnetic three-way change-over valve 70. The diaphragm 92a and the piston 95 are moved downward by means of the spring 92b to depress the valve body 96a, thus bringing the chamber 97a into communication with the chamber 97b. Consequently, the hydraulic pressure in the master cylinder 30 is passed without change to the wheel cylinder. Thus, normal braking operation is performed in accordance with the effort applied to the brake pedal 40. When the pressure reducing signal is generated, the atmospheric pressure is introduced into the chamber 94 by means of the electromagnetic three-way change-over valve 70. The diaphragm 92a and the piston 95 are moved upward due to the difference between the pressure in the chamber 94 and that in the chamber 93. Consequently, the depression of the valve body 96a is released and the line 11 is shut off. At this time, the piston 95 is further moved upward to increase the volume of the chamber 97a, and therefore the braking pressure of the wheel cylinder 20 is decreased and the braking force of the wheel 10 is also reduced.

The control circuit 60 will be described hereinbelow with reference to FIG. 2. A capacitor 101 is connected to the wheel velocity voltage generator 50 by way of a reverse current preventing diode 102. Said capacitor 101 is charged by the wheel velocity voltage. The collector and emitter electrodes of a transistor 103 for discharging said capacitor 101 at a time constant corresponding to the predetermined set deceleration are connected in parallel with the capacitor 101. Thus, the reference wheel velocity voltage corresponding to the reference wheel velocity decreasing at the set deceleration is developed across capacitor 101. The base of transistor 103 is connected to a pair of resistors 104 and 105 at the power source side by way of a pair of diodes 106 and 107 which are provided to prevent mutual interference between the currents flowing through the two circuits. Thus, the set deceleration, which is a discharge time constant of the capacitor 101, is determined. Furthermore, the capacitor 101 is connected in parallel with a transistor 108. The transistor 108 discharges the electric charge of capacitor 101 at a time constant larger than the time constant determined by the transistor 103.

The input terminals of a differential amplifier 109 are directly connected to the wheel velocity voltage generator 50 as well as to the capacitor 101. By comparing the wheel velocity voltage and the reference wheel velocity voltage, said differential amplifier 109 derives a positive potential (logical signal "1") when the former is lower than the latter and derives a negative potential (logical signal "0") when the former is higher than the latter.

NAND gates 111, 112 and 114 and NOT gate 113 are of conventional type. The NAND gate 111 is connected to the output terminal of the differential amplifier 109 and the output terminal thereof is connected to the expander input terminal by way of a resistor 117 and a capacitor 116, thus constituting a delay circuit. One of two input terminals of the NAND gate 112 is connected to the output terminal of the NAND gate 111, and the other input terminal thereof is connected to the output terminal of the differential amplifier 109 thereby constituting a time limiting circuit. Thus, when the signal "1" is produced by the differential amplifier 109 in conjunction with the NAND gate 111, a signal for determining a definite time from the production of the above-mentioned signal is issued. the NOT gate 113 is connected to the output terminal of the NAND gate 112 and takes the "not" of the signal passed from the gate 112. One of two input terminals of the NAND gate 114 is connected to the differential amplifier 109 and another input terminal thereof is connected to the NOT gate 113. Moreover, the output terminal of said NAND gate 114 is connected to the base of a transistor 115. Thus, by taking the "not" of the "and" of both signals, the base current of the transistor 115 is cut off to drive said transistor into non-conduction during a definite time determined by the time limiting circuit of the NAND gate 112 after the differential amplifier 109 has issued the signal "1."

A capacitor 119 and a resistor 120 constitutes a differentiating circuit. Said differentiating circuit is connected to the output terminal of the differential amplifier 109 and derives a positive differential output by differentiating the output signal of the differential amplifier 109 at the instant when the signal "1" is produced, but derives the negative differential output when the signal "0" is produced. The input terminal of a differential amplifier 118 is connected to the differentiating circuit and the output terminal thereof is connected to the base of the transistor 108. Thus, the phase is inverted to derive the negative potential when the positive differential output is generated but to derive the positive potential when the negative differential output is generated.

An AND gate 121 is also of conventional type. One of two input terminals thereof is connected to the output of the differential amplifier 109 and another input terminal thereof is connected through the braking switch 41 to a power source 122. The output terminal of said AND gate 121 is connected through a resistor 123 to the base of a power transistor 110. Thus, the transistor 110 is caused to conduct by the "and" of both inputs. The collector of the power transistor 110 is connected to the electromagnetic coil 79 of said electromagnetic three-way change-over valve 70. The electromagnetic coil 79 is excited when the transistor 110 conducts. Two braking lamps 42a and 42b having low resistance lamp filaments are connected to the braking switch 41 and burn when the switch 41 is turned on.

The operation of the above-described device will be described hereinbelow.

When wheel lock is likely to be caused due to the application of emergency braking during travelling, the braking switch 41 interlocked with the brake pedal 40 is closed. Consequently, the signal "1" is applied to the AND gate 121 and the braking lamps 42a and 42b are lit. At the same time, the differential amplifier 109 compares the wheel velocity voltage derived from the wheel velocity voltage generator 50 and the reference wheel velocity voltage from the capacitor 101 an issues the braking pressure reducing signal "1," which is then applied to the AND gate 121. Therefore, the AND gate 121 derives the output in accordance with the "and" to cause transistor 110 to conduct, thereby exciting the electromagnetic coil 79. Thus, the electromagnetic three-way change-over valve 70 admits atmospheric pressure into the braking pressure modulator 90. The braking pressure modulator 90 closes the brake line 11b to reduce the braking pressure, thus restoring the wheel velocity. At this time, other elements of the control circuit 60 determine the set deceleration of the reference wheel velocity in several steps of specified time. These reference wheel velocities are compared with respective wheel velocities, thereby braking the vehicle in the minimum distance with the maximum coefficient of friction between the wheel and road surface.

When brake operation by the brake pedal 40 does not take place, the braking switch 41 is open and one input signal of the AND gate 121 is "0." Also, the braking lamps 42a and 42b go out. Consequently, the AND gate 121 does not produce an output in accordance with the "and" even if the differential amplifier 109 detects wheel lock in the manner as described above and issues the signal "1" when a wheel is rotating idly. Thus, the electromagnetic coil 79 is de-energized. Skid control by means of the electromagnetic three-way change-over valve 70 and the braking pressure modulator 90 is not performed and a normal braking condition is developed.

As described above, the skid control device according to this invention performs a skid control operation only when the brake is being applied. If the wheels of the vehicle are rotating idly without applying efforts to the brake pedal, normal braking operation is ensured. Therefore, the disadvantages caused by unwanted braking when the wheel is rotating idly are eliminated.

What is claimed is:

1. A vehicle speed control device wherein a reference wheel velocity is so set as to decrease at a predetermined rate and the wheel braking pressure is decreased when the instantaneous value of the actual wheel velocity in deceleration becomes lower than the instantaneous value of said reference wheel velocity decreasing at a predetermined rate thereby preventing wheel lock, the improvement comprising comparator means for comparing a signal corresponding to said actual wheel velocity with a signal corresponding to said instantaneous reference wheel velocity decreasing at a predetermined rate, said comparator means producing an output signal when the actual wheel velocity is lower than said instantaneous reference wheel velocity; a braking switch interlocked with the brake pedal for providing a signal only during braking; and an AND circuit having its inputs coupled to the output of said comparator means and to said braking switch, said AND circuit energizing the braking circuit to control skidding only when the brake is applied by depressing the brake pedal.

2. The skid control device defined by claim 1 wherein said comparator means comprises a differential amplifier.

* * * * *